United States Patent [19]
Mai et al.

[11] Patent Number: 5,671,088
[45] Date of Patent: Sep. 23, 1997

[54] VARIABLE OPTICAL AIMING DEVICES

[75] Inventors: Neil Mai; Mark Thomas, both of Beaverton; Klaus Mahr, Portland, all of Oreg.

[73] Assignee: Leupold & Stevens, Inc., Beaverton, Oreg.

[21] Appl. No.: 894,054

[22] Filed: Jun. 3, 1992

[51] Int. Cl.$^6$ .............. G02B 23/00; G02B 7/02; F41G 1/38

[52] U.S. Cl. .............. 359/424; 359/422; 359/819; 33/246

[58] Field of Search .............. 359/414, 416, 359/423–431, 819–826, 399, 405–406, 422–429, 820, 823, 827, 432, 241, 245–252, 299; 356/153–155, 251, 252; 33/241, 245–252, 299; 42/100–105

[56] References Cited

U.S. PATENT DOCUMENTS

| | | | |
|---|---|---|---|
| 3,423,146 | 1/1969 | Weaver | 359/422 |
| 3,429,634 | 2/1969 | Weaver | 33/246 |
| 3,819,254 | 6/1974 | Hummel et al. | 359/826 |
| 3,902,251 | 9/1975 | Ross | 33/246 |
| 3,962,795 | 6/1976 | Ross | 33/246 |
| 4,303,306 | 12/1981 | Ookawa | 359/819 |
| 4,336,979 | 6/1982 | Hamatani | 359/826 |
| 4,395,096 | 7/1983 | Gibson | 359/424 |
| 4,408,842 | 10/1983 | Gibson | 359/424 |
| 4,733,945 | 3/1988 | Bacich | 359/820 |
| 4,850,674 | 7/1989 | Hasselskog | 359/820 |
| 5,053,794 | 10/1991 | Benz | 359/819 |
| 5,202,706 | 4/1993 | Hasegawa | 359/819 |
| 5,262,900 | 11/1993 | Gerber | 359/819 |
| 5,299,067 | 3/1994 | Kutz et al. | 359/422 |

FOREIGN PATENT DOCUMENTS

| 86315 | 4/1987 | Japan | 359/819 |
|---|---|---|---|

*Primary Examiner*—Thong Nguyen
*Attorney, Agent, or Firm*—Stoel Rives LLP

[57] ABSTRACT

The present invention provides an erector system characterized by centered erector lenses and lens holder movement capability to alter relative erector lens placement. Alignment of the erector lens optical centers facilitates the reduction of the phenomenon of trackout. Alteration of relative erector lens position permits a pistol scope or another device embodying the erector system to operate at more than one magnification.

9 Claims, 2 Drawing Sheets

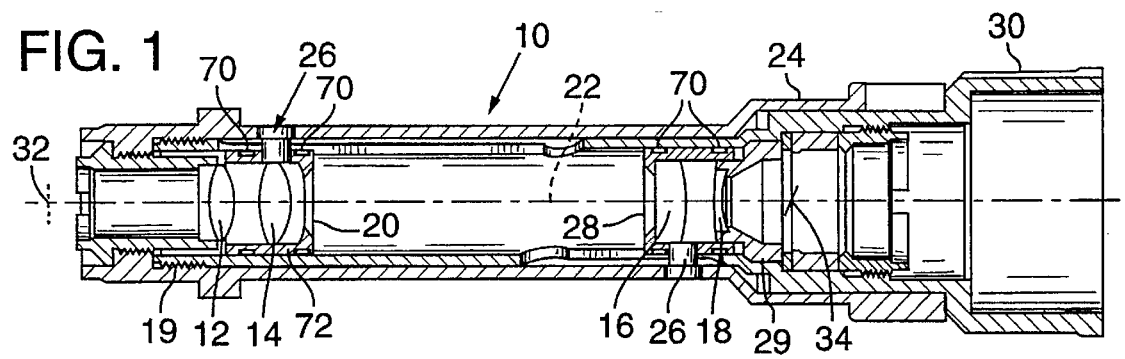
FIG. 1
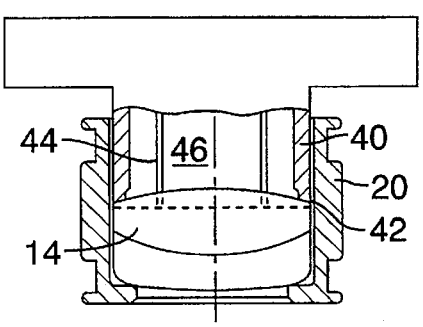
FIG. 2
FIG. 3
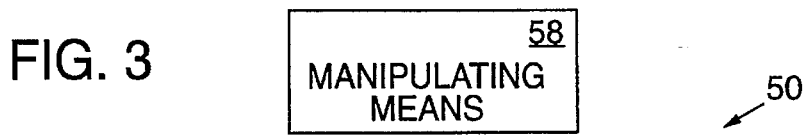
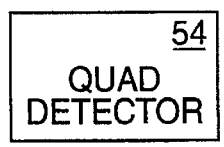
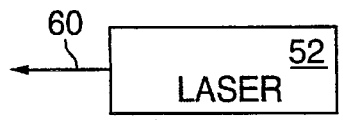

VARIABLE OPTICAL AIMING DEVICES

TECHNICAL FIELD

The present invention relates to improved aiming devices. More specifically, the present invention relates to variable power pistol scopes having an erector system wherein erector lenses are aligned in a manner that decreases the incidence of the phenomenon of trackout.

BACKGROUND OF THE INVENTION

Generally, an erector system consists of an objective lens, an erector lens system (e.g., a four lens system), a reticle (e.g., cross-hair) and an eyepiece. These components are typically mounted in an aluminum tube (e.g., a pivot tube). The objective projects an image of a target onto a first image plane, located at the focal point of the objective which is positioned forward of the erector lens system. The erector lens system inverts the image and projects it onto a second image plane. The reticle is located at the position of the second image plane. The eyepiece magnifies the target image together with the reticle.

A magnification change (e.g., from 2.5× to 8×) is accomplished by altering the relative axial position of the inner (forward positioned) two of the four lenses of an erector lens system. This alteration may be conducted by employing a cam tube in combination with the pivot tube housing the erector lenses. If the optical centers of the erector lenses are not aligned, the phenomenon of trackout occurs. Trackout constitutes an image shift resulting from misalignment of one lens relative to the other lenses.

Prior art scope designs are plagued by trackout. For example, one prior art scope includes an erector lens system that is fitted precisely inside a pivot tube, but manufacturing tolerances of the lenses and lens holder result in an amount of play with respect to individual lens position. The lenses of such prior art scopes are not therefore centered for optimal point-of-aim accuracy.

Another prior art scope design includes an erector lens system employing two small sizer pads. This configuration eliminates any play between the erector lens system and the pivot tube, while displacing the erector lens system to an off-center position. To compensate for this displacement, the reticle is adjusted.

SUMMARY OF THE INVENTION

The present invention provides an erector system characterized by centered erector lenses and lens holder movement capability to alter relative erector lens placement. Alignment of the erector lens optical centers facilitates the reduction of the phenomenon of trackout. Alteration of erector lens position permits a pistol scope or other device embodying the erector system to operate at more than one magnification.

The present invention contemplates centering of two types, centering of lenses within lens holders and centering of lens holders within the pivot tube. Lens/lens holder centering may be accomplished by mechanical, optical or other means. Lens holder/pivot tube centering is preferably accomplished through the use of a centering bearing.

Mechanical lens/lens holder centering of the present invention is preferably conducted by a centering tool that is inserted within a lens holder and into engagement with a lens. The centering tool interfaces with the lens holder and lens, such that the lens is centered within the lens holder. Preferably, the centering tool is a cylindrical tube having an outer diameter less than the inner diameter of the lens holder, is characterized by a tapered inside end for lens engagement, and is formed of a plurality of segments wherein each segment is free to flex when the centering tool engages the lens. When the centering tool is pushed into a lens holder and against a lens, the segments bend outward until they contact the inner diameter of the lens holder, thereby centering the lens therein.

A preferred optical lens/lens holder centering mechanism of the present invention includes a laser, a quad detector, a mounting means and a manipulating means. A lens holder is mounted on the mounting means, and if the lens is not properly centered within the lens holder, the quad detector will detect and measure a deviation in the path of the laser beam generated by the laser. The manipulating means alters the position of the lens within the lens holder in a manner calculated to correct the measured path deviation.

The preferred centering bearing of the present invention insures straight, no-play fit of the lens holders within the pivot tube. Centering bearings are preferably formed of a flexible material and have a plurality of protrusions or ridges formed on the outer surface thereof. In addition, the diametrical dimension of the lens holder/centering bearing assembly at the locations of the protrusions or ridges exceeds the inner diameter of the pivot tube. When the lens holder/centering bearing assembly is pressed into the pivot tube, the protrusions or ridges are deformed, thereby providing a no-play fit between the lens holder and the pivot tube, while still permitting the lens holder to move within pivot tube, if desired.

A preferred configuration of the centering bearing of the present invention features six protrusions or ridges disposed about the periphery thereof. A single side flange and an open structural configuration are additional characteristics of a preferred centering bearing configuration.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings in which:

FIG. 1 is a cross-sectional, partial side view of an erector system of the present invention;

FIG. 2 is a cross-sectional, partial side view of a centering tool useful in the practice of embodiments of the present invention;

FIG. 3 is a schematic representation of an embodiment of an optical centering mechanism of the present invention.

FIG. 6b is an enlargement of the feature "A" of the embodiment of the centering bearing shown in FIG. 6a.

DESCRIPTION OF PREFERRED EMBODIMENTS

Figure 4:
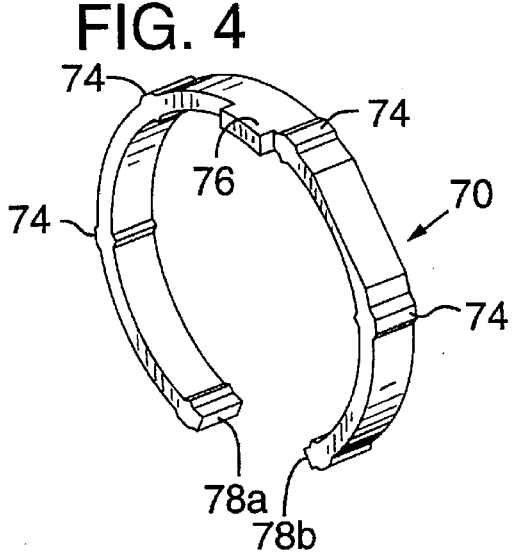
FIG. 4 is an isometric view of an embodiment of a centering bearing useful in the practice of the present invention.
Figure 5:
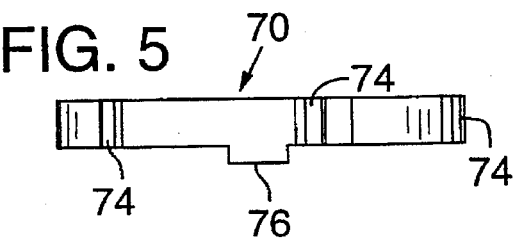
FIG. 5 is a top view of the embodiment of the centering bearing shown in FIG. 4.

For the purposes of this description, the term "forward" indicates the portion of an erector system disposed further from the eyepiece thereof, and the term "rearward" indicates the portion of an erector system disposed closer to the eyepiece.

The present invention provides improved scopes capable of magnification alteration with reduced incidence of trackout. While the description of the invention is presented below in terms of pistol scopes, the principles of the present invention may be employed in the design or implementation of scopes for other firearms as well as other similar devices.

FIG. 1 shows an embodiment of a pistol scope erector system 10 of the present invention, including a first erector lens 12, a second erector lens 14, a third erector lens 16 and a fourth erector lens 18. First erector lens 12 is maintained in a fixed position through interface with an affixing means 19, shown in FIG. 1 as a field lens collector. Second erector lens 14 is housed within a first lens holder 20, which is capable of motion along an axis 22 of pistol scope erector system 10. Axial motion of lens holder 20 is achieved by the interface thereof with a cam tube 24 through an interfacing means 26, shown as a cam follower screw. Third erector lens 16 is housed within a second movable lens holder 28, while fourth erector lens 18 is housed within a fixed position lens holder 29. Affixing means 19 as well as first, second and third lens holders 20, 28 and 29 are housed within a pivot tube 30. These components of erector system 10 are disposed rearward of a first image plane 32 generated by an objective lens (not shown) and forward of a reticle 34 co-located with a second image plane. The details of the objective lens and eyepiece components of erector system 10 are not shown and are known in the art.

Erector lenses 12, 14, 16 and 18 are sized and configured to interface with affixing means 19, lens holder 20, lens holder 28 or lens holder 29. In addition, erector lenses 12, 14, 16 and 18 are designed to act together to produce target magnification(s) of desired magnitudes. Exemplary magnifications are 2.5× and 8×.

Erector lenses 12, 14, 16 and 18 useful in the practice of the present invention are known and commercially available. Suitable lenses are available from, for example, Norira Corporation, Tokyo, Japan and Kyocera, Tokyo, Japan.

As an affixing means 19 or a third lens holder 29, the present invention contemplates any convenient mechanism therefor, such as a turned aluminum lens holder or the like.

Lens holders 20, 28 and 29 useful in the practice of the present invention are sized and configured to interface with erector lenses 14, 16 and 18, pivot tube 30 and, preferably, one or more centering bearings as described below. Lens holders 20 and 28 are additionally sized and configured to interface with cam tube 24 through interfacing means 26. Lens holders 20, 28 and 29 may be formed of any convenient material therefor, such as brass, steel, aluminum, composite materials or the like.

Cam tube 24/interfacing means 26 constitute a conventional mechanism employed in scopes to achieve axial lens movement. Cam tube 24/interfacing means 26 are sized and configured to interface with lens holders 20 and 28 and permit a range of motion thereof corresponding to the range of magnification of the scope.

Pivot tubes 30 useful in the practice of the present invention are sized and configured to house erector system 10 components, including erector lenses 12, 14, 16 and 18, affixing means 19, lens holders 20, 28 and 29, a reticle (e.g., cross-hair), and an eyepiece. Pivot tubes 30 may be formed of any convenient material therefor, such as aluminum, brass, steel, composite materials or the like.

The reduction in trackout of the present invention results, at least in part, from centering erector lenses 12, 14, 16 and 18. As a result of generally employed scope configuration, two types of centering are contemplated by the present invention, centering lenses 12, 14, 16 and 18 within lens holders 20, 28 and 29 and centering lens holders 20, 28 and 29 within pivot tube 30.

Lens centering of the present invention may be accomplished by mechanical, optical or like means. More specifically, an embodiment of a mechanical centering mechanism is shown in FIG. 2.

A centering tool 40 is inserted within lens holder 20 or 28 (shown as lens holder 20 in FIG. 2) to engage a lens 14, 16 or 18 (shown as lens 14 in FIG. 2). Centering tool 40 is sized and configured to interface with lens holder 20 or 28 and lens 14, 16 or 18, such that the lens is centered within the lens holder. Preferably, centering tool 40 is a cylindrical tube having an outer diameter less than the inner diameter of lens holder 20 or 28. Also, centering tool 40 preferably is characterized by a tapered inside end 42 to engage the 45° bevel of lens 14, 16 or 18. Again preferably, centering tool 40 is segmented, having a plurality of segment boundaries 44, such that each segment 46 is free to flex after tapered end 42 impacts the lens bevel. This preferred centering tool 40 is useful in the practice of the present invention, provided that the outer diameter of lens 14, 16 or 18 is ground concentric to the optical center thereof.

Centering tool 40 may be formed from any convenient material therefor, with durable and flexible materials preferred. Exemplary centering tool materials are acetal, polyamide and the like.

The precise size and configuration of centering tool 40 depend upon the size and configuration of lens holders 20, 28 or 29 and lenses 14, 16 or 18. In general, centering tool 40 is cylindrical in shape and preferably ranges from about 0.28 to about 0.34 inch in diameter, with about 0.333 inch preferred. Also, centering tool 40 preferably ranges from about 0.750 to about 1.00 inch in length, with from about 0.80 to about 0.88 inch more preferred. The thickness of the walls of centering tool 40 generally ranges from about 0.040 to about 0.060 inch, with about 0.050 inch more preferred.

Tapered ends 42 of centering tool 40 are sized and configured to conform to the bevel of lens 14, 16 or 18. Exemplary of a suitable lens bevel for this purpose is a 45° bevel. Tapered ends 42 may be fabricated using known machining techniques.

Centering tool 40 is preferably segmented. The precise number of segments depend on several factors, including the diameter of the lens to be centered. Generally, centering tool 40 is partitioned into from about 3 to about 12 segments, with about 6 segments preferred. In operation, centering tool 40 is pushed into lens holder 20, 28 or 29 and into contact with lens 14, 16 or 18. Continued force application upon centering tool 40 causes segments 46 to bend outward (away from axis 22 of erector system 10) until segments 46 contact the inner diameter of lens holder 20, 28 or 29. In this configuration, lens 14, 16 or 18 is centered within corresponding lens holder 20, 28 or 29 through contact with tapered end 42 of centering tool 40. Lens 14, 16 or 18 is bonded in the centered position using any conventional technique therefor. A preferred technique for this purpose is the use of adhesives, with the ultraviolet cure family of adhesives more preferred.

Lens centering may also be accomplished in accordance with the present invention by optical means. An embodiment of an optical centering mechanism is shown schematically in FIG. 3.

An optical centering mechanism 50 includes a laser 52, a quad detector 54, a mounting means 56 and a manipulating means 58. Laser 52 emits a coherent beam of light therefrom in a straightline path 60. Quad detector 54 detects and measures laser beam deviation from straightline path 60. Mounting means 56 positions lens holder 20, 28 or 29 at a location concentric to the laser beam emanating from laser 52. Manipulating means 58 maneuvers lens 14, 16 or 18 within lens holder 20, 28 or 29, until centered alignment is achieved.

Lasers 52 useful in the practice of the present invention are known and commercially available from, for example, Spectra Physics, Mountain View, Calif.

Quad detectors 54 useful in the practice of the present invention are known and commercially available from, for example, United Detector Technology, Orlando, Fla.

Mounting means 56 useful in the practice of the present invention are known and commercially available from Newport Research, Fountain Valley, Calif., for example.

Manipulating means 58 useful in the practice of the present invention are known and commercially available from Newport Research, Fountain Valley, Calif., for example.

In operation, lens holder 20, 28 or 29, is mounted on mounting means 56 in a position concentric to straightline path 60, and laser 52 is activated. If lens 14, 16 or 18 is not properly centered within lens holder 20, 28 or 29, quad detector 54 will detect and measure a deviation of the laser beam generated by laser 52 from straightline path 60. Upon quad detector 54 path deviation detection and measurement, manipulating means 58 alters the position of lens 14, 16 or 18 within lens holder 20, 28 or 29, in a manner calculated to correct the measured path deviation. This calculation employs known relationships between laser beam deviation and lens surface curvature derived from standard optical formulas recited, for example, in the textbook "Modern Optical Engineering" by Warren Smith. This process is repeated until no (or substantially no) laser beam deviation from straightline path 60 is detected by quad detector 54. In this configuration, lenses are centered within the corresponding lens holders and are bonded in that centered position using any conventional technique therefor. Adhesives, such as the ultraviolet cure family of adhesives, are preferred for this purpose.

In addition to centering the erector lenses within the lens holders therefor, scopes 10 of the present invention are also preferably characterized by lens holders 20 and 28 centered within pivot tube 30. FIGS. 4, 5, 6a and 6b show a preferred embodiment of a centering bearing 70 useful to insure straight, no-play tracking of lens holders 20 and 28 and no-play, fixed position fit of lens holder 29 within pivot tube 30. In addition, FIG. 1 depicts a plurality of centering bearings 70 in operation.

Figure 6A:
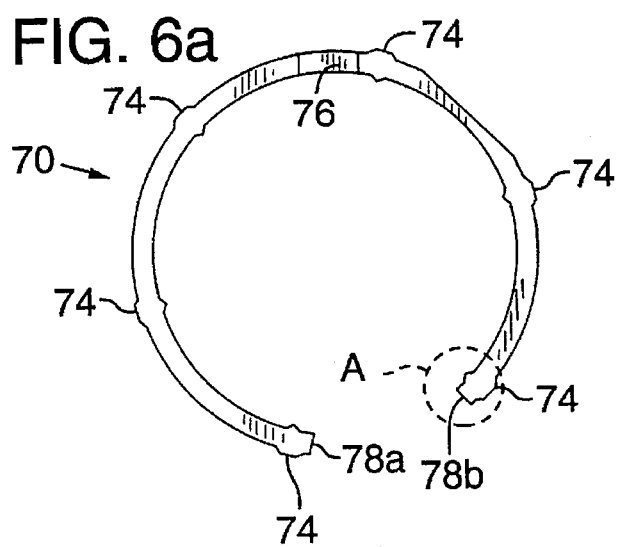
FIG. 6a is a side view of the embodiment of the centering bearing shown in FIGS. 4 and 5.
Figure 6B:
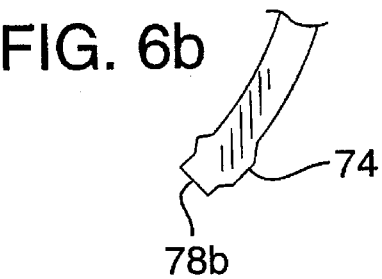

Centering bearings 70 useful in the practice of the present invention may be of any convenient size and configuration to provide for no-play fit of lens holders 20 or 28 within pivot tube 30. As shown in FIG. 1, two centering bearings 70 are preferably sized and configured to be placed within corresponding annular grooves 72 formed on the outer surface of lens holders 20 or 28. Centering bearings 70 are preferably formed of a flexible material and have a plurality of protrusions or ridges 74 formed on the outer surface thereof. As shown in FIGS. 4 and 6a, the interior of each centering bearing 70 is generally flat. Preferably, the diametrical dimension of the lens holders 20 or 28/centering bearing 70 assembly at the locations of protrusions or ridges 74 exceeds the inner diameter of pivot tube 30. When the lens holders 20 or 28/centering bearing 70 assembly is pressed into pivot tube 30, the protrusions or ridges 74 are deformed, thereby providing a no-play fit between lens holders 20 or 28 and pivot tube 30, while still permitting lens holder 20 to move within pivot tube 30. Lens holder 29 is centered using closely controlled component dimensions. Also, lens holder 29 is secured in pivot tube 30 by a locknut located behind (to the right) of the reticle.

A preferred configuration of centering bearing 70 is shown in FIGS. 4, 5, 6a and 6b. This centering bearing 70 embodiment features six protrusions or ridges 74 disposed about the periphery thereof. A single side flange 76, useful for preventing rotation of centering bearing 70 during operation, is also employed in this preferred centering bearing 70 structure. The preferred centering bearing 70 also features an open structure bounded by bearing walls 78a and 78b. Such an open structure facilitates formation of the lens holders 20 or 28/centering bearing 70 assembly and accommodates tolerance variations of centering bearing 70. Performance testing has revealed that temperature variation does not adversely impact the performance of this embodiment of centering mechanism of the present invention. The dimensions of the structural features of centering bearing 70 directly impact the accuracy of the reduced trackout feature of erector systems 10 of the present invention.

Centering bearings 70 useful in the practice of the present invention may be formed of any durable and flexible material, with flexible plastic materials preferred. Exemplary centering bearing materials are polyethylene, the specific type of nylon named nylon 12 and the like.

The precise size and configuration of centering bearings 70 depend upon the size and configuration of pivot tube 30 and lens holders 20 or 28, especially grooves 72 thereof. In general, centering bearing 70 preferably ranges from about 0.440 to about 0.456 inch in diameter, with about 0.440 inch more preferred. Also, centering bearing 70 preferably ranges from about 0.015 to about 0.060 inch in width (the dimension corresponding to the dimension of annular grooves 72 in the direction of axis 22 of erector system 10), with from about 0.052 to about 0.058 inch more preferred. The thickness (the dimension corresponding to the depth of annular grooves 72) of centering bearings 70 generally ranges from about 0.023 to about 0.027 inch, with about 0.025 inch more preferred.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. In a variable magnification optical device having a longitudinal axis along which an erector lens assembly and a reticle are positioned successively within the device, the erector lens assembly comprising:

first and second erector lenses that are positioned in respective first and second lens holders, the first and second lens holders being operatively connected to a cam tube for moving the first and second lens holders along the longitudinal axis and being supported within a pivot tube that has an inner surface and an inner diameter by first and second flexible centering bearings having a plurality of ridges spaced apart from one another and defining an outer diameter of each bearing that is greater than the inner diameter of the pivot tube, the centering bearings being held under compression between the pivot tube and the first and second lens holders, respectively, the ridges being deformed by the compression so that the outer diameter defined by the ridges conforms to the inner diameter of the pivot tube, thereby providing a no-play fit between the lens holder and the pivot tube and preventing trackout.

2. The erector lens assembly of claim 1 wherein at least one of the first and second centering bearings forms an open loop.

3. The erector lens assembly of claim 1 wherein at least one of the first and second lens holders includes in its outer surface an annular groove that is sized and configured to accommodate the corresponding one of the first and second centering bearings.

4. An optical assembly centering bearing for providing, in an optical device having a longitudinal axis, support between a lens holder operatively connected to a cam tube for moving the lens holder along the longitudinal axis and a pivot tube having an inner surface and an inner diameter, comprising:

a flexible strip formed in the shape of a generally circular band of nonuniform thickness, the band having a single generally flat inner surface for engaging the lens holder and an outer surface with plural deformable ridges for defining an outer diameter of the flexible strip that is greater than the inner diameter of the pivot tube and for engaging the inner surface of the pivot tube under compression, the ridges being deformed by the compression so that the outer diameter defined by the ridges conforms to the inner diameter of the pivot tube and preventing trackout by providing a no-play fit between the lens holder and the inner surface of the pivot tube.

5. The centering bearing of claim 4 wherein the band forms an open loop.

6. In a variable magnification optical device having a longitudinal axis along which an erector lens assembly and a reticle are positioned successively within the device, the erector lens assembly comprising:

a first erector lens positioned in a first lens holder operatively connected to a cam tube for moving the first lens holder along the longitudinal axis, the first lens holder being supported within a pivot tube having an inner surface and an inner diameter by a first centering bearing held under compression between the pivot tube and the first lens holder, the first centering bearing including a generally circular, flexible band having a generally flat inner surface for engaging the lens holder and a generally flat outer surface with plural spaced apart deformable ridges for defining an outer diameter of the flexible strip that is greater than the inner diameter of the pivot tube and for engaging the pivot tube under compression, the ridges being deformed by the compression so that the outer diameter defined by the ridges conforms to the inner diameter of the pivot tube, and preventing trackout by providing a no-play fit between the first lens holder and the inner surface of the pivot tube.

7. The erector lens assembly of claim 6 wherein the flexible band of the first centering bearing forms an open loop.

8. The erector lens assembly of claim 6 further comprising a second centering bearing held under compression between the pivot tube and the first lens holder for supporting the first lens holder, the second centering bearing including a generally circular, flexible band having a generally flat inner surface for engaging the lens holder and a generally flat outer surface with plural spaced apart deformable ridges for defining an outer diameter of the flexible strip that is greater than the inner diameter of the pivot tube and for engaging the pivot tube under compression, the ridges being deformed by the compression so that the outer diameter defined by the ridges conforms to the inner diameter of the pivot tube, and preventing trackout by providing a no-play fit between the first lens holder and the inner surface of the pivot tube.

9. The erector lens assembly of claim 6 wherein the first lens holder includes in its outer surface an annular groove sized and configured to accommodate the first centering bearing.

* * * * *